C. A. DAY.
WHEEL GUARD.
APPLICATION FILED JULY 27, 1914.
1,202,811.
Patented Oct. 31, 1916.
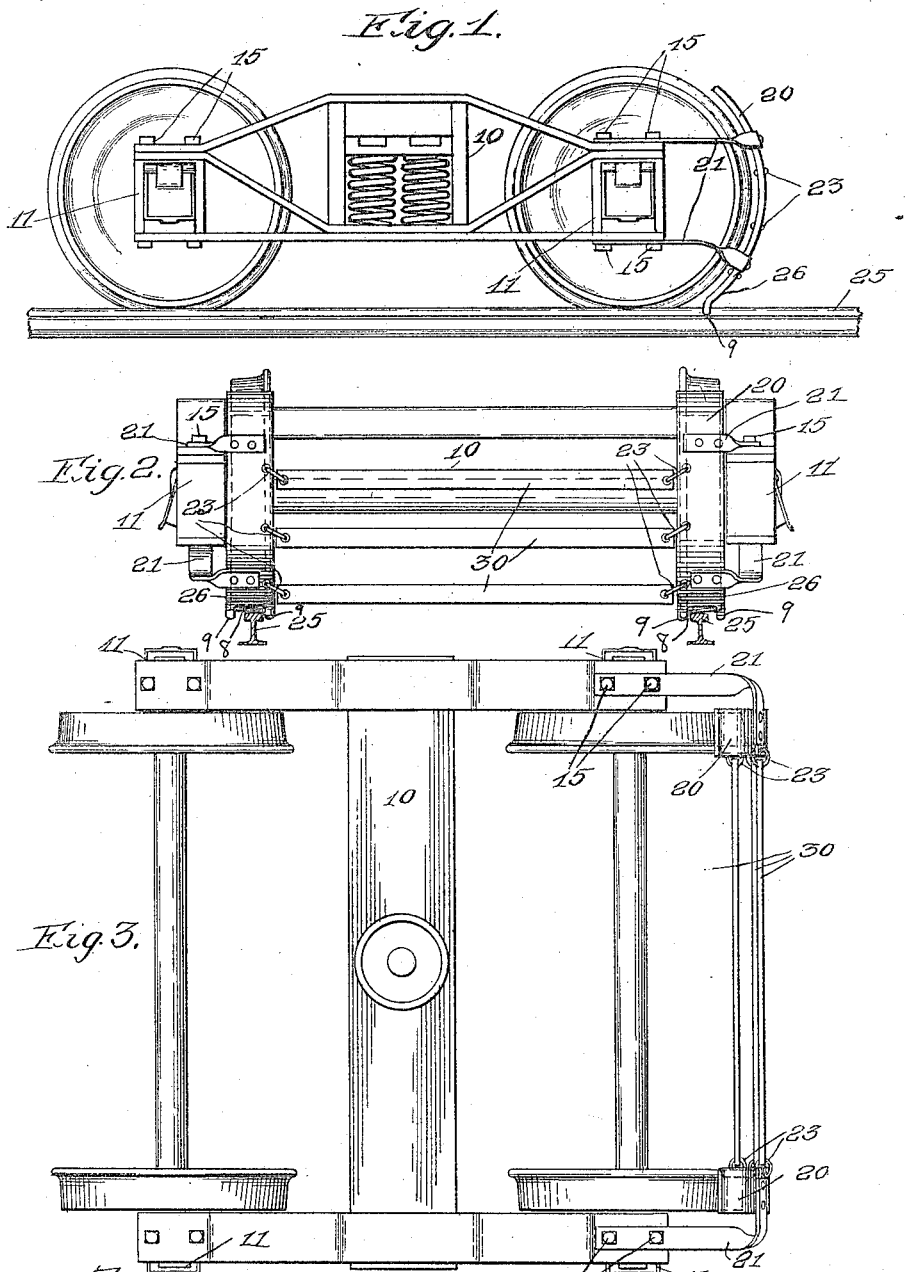
Witnesses:
Inventor
Charles A. Day.

UNITED STATES PATENT OFFICE.

CHARLES A. DAY, OF CHICAGO, ILLINOIS.

WHEEL-GUARD.

1,202,811.　　　　Specification of Letters Patent.　　Patented Oct. 31, 1916.

Application filed July 27, 1914.　Serial No. 853,333.

*To all whom it may concern:*

Be it known that I, CHARLES A. DAY, a citizen of the United States, residing at 640 Grand avenue, in Chicago, county of Cook, and State of Illinois, have invented new and useful Improvements in Wheel-Guards, of which the following is a specification.

This invention relates to improvements in wheel guards or fenders, and more especially to a device designed for use in connection with a railroad car.

It is well known that hundreds of railroad employees are killed or injured each year in the United States in their duties in and about the cars, such as coupling and uncoupling trains and examining and handling air brake fittings and other parts; and in a large number of such cases accidents occur through the absence of any sort of guard or fender on the end wheels of one of the cars, the employee being caught between two cars and not struck by the front of the train. Such accidents could be avoided by equipping each car with an effective fender at each end, and accordingly the present invention is designed to afford such a device.

A wheel guard or fender embodying the principles of the present invention is illustrated in the accompanying drawings in which:

Figure 1 is a view showing a car truck in side elevation with the device in place. Fig. 2 is a similar view in end elevation. Fig. 3 is a top plan view.

As shown in said drawings, a car truck of well known form is here shown as comprising side frame members 10 resting at their ends on journal boxes 11, 11 to which they are bolted by large bolts 15, these parts all being of well known construction and not constituting any part of the present invention. The improved fender or wheel guard comprises a pair of curved, flat plates 20, 20, one for each front wheel, to which plates are secured arms 21, 21, the latter being preferably in the form of heavy iron or steel straps which are riveted at their forward ends to the curved guards 20 and thence bent backward and twisted so as to present flat, horizontal surfaces which embrace the ends of the truck frame members 10 and are secured thereto by the large journal bolts 15.

In this manner the fender may be secured to such a truck, or to trucks of standard designs which are constructed with bolts in the corresponding positions of the bolts 15 to secure the truck frames to the journal members, without the alteration of such trucks in any manner. The lower end 26 of each guard plate 20 is brought down close to the rail 25 and its extreme lower end is curved away from the wheel and slightly widened and hollowed out in the center to form a recess 8 to accommodate unevenness in the track. This recess 8 consequently leaves two depending tongues 9, 9, each of which extends to a point lower than the surface of the rail.

In order to protect the open space between the wheels, the guard members 20 are connected by horizontal cross bars 30, 30, the ends of which are preferably secured to the guard plates 20 by means of chain links 23, 23, so that the distance apart of the two wheel plates 20 may be varied somewhat, without altering the construction of the device.

I claim as my invention:

1. The combination with a car truck comprising a frame member, a journal box, and bolts securing such parts together, of a fender comprising curved wheel guards each having arms secured thereto and adapted for engagement with such bolts, a horizontal cross-bar extending from one wheel guard to the other, and an extensible connection between an end of such cross-bar and one of the wheel guards.

2. The combination with a car truck comprising a frame member, a journal box and bolts securing such parts together, of a fender comprising curved wheel guards, each having arms secured thereto and adapted for engagement with such bolts, a horizontal cross-bar extending from one wheel guard to the other, and a link connecting an end of such cross-bar to one of the wheel guards.

In witness whereof, I have hereunto subscribed my name in the presence of two witnesses this 23rd day of July, 1914.

CHARLES A. DAY.

Witnesses:
　LILLIAN E. CHRISTIANSON,
　CAROLINE M. JONAS.

Copies of this patent may be obtained for five cents each, by addressing the "Commissioner of Patents, Washington, D. C."